(12) United States Patent
Burrows

(10) Patent No.: US 10,894,731 B2
(45) Date of Patent: Jan. 19, 2021

(54) OZONE GENERATOR FOR WATER PURIFICATION SYSTEM

(71) Applicant: DS SERVICES OF AMERICA, INC., Atlanta, GA (US)

(72) Inventor: Bruce D. Burrows, Valencia, CA (US)

(73) Assignee: DS SERVICES OF AMERICA, INC., Atlanta, GA (US)

( * ) Notice: Subject to any disclaimer, the term of this patent is extended or adjusted under 35 U.S.C. 154(b) by 353 days.

(21) Appl. No.: 15/792,858

(22) Filed: Oct. 25, 2017

(65) Prior Publication Data

US 2018/0111861 A1    Apr. 26, 2018

Related U.S. Application Data

(60) Provisional application No. 62/412,794, filed on Oct. 25, 2016.

(51) Int. Cl.
| | |
|---|---|
| C02F 1/78 | (2006.01) |
| C02F 1/00 | (2006.01) |
| C02F 1/44 | (2006.01) |
| C01B 13/10 | (2006.01) |
| C02F 101/36 | (2006.01) |
| B01D 61/58 | (2006.01) |

(Continued)

(52) U.S. Cl.
CPC ............... *C02F 1/78* (2013.01); *C01B 13/10* (2013.01); *C02F 1/001* (2013.01); *C02F 1/441* (2013.01); *B01D 15/02* (2013.01); *B01D 61/025* (2013.01); *B01D 61/58* (2013.01); *B01D 2311/04* (2013.01); *B01D 2311/06* (2013.01); *B01D 2311/2634* (2013.01); *B01D 2313/40* (2013.01); *C01B 2201/90* (2013.01); *C02F 1/283* (2013.01); *C02F 2101/36* (2013.01); *C02F 2201/782* (2013.01); *C02F 2201/784* (2013.01); *C02F 2209/006* (2013.01)

(58) Field of Classification Search
CPC .. C02F 1/28; C02F 1/283; C02F 1/281; C02F 1/288; C02F 1/44; C02F 1/441; C02F 1/444; C02F 1/78; C02F 1/4672; C02F 2201/78; C02F 2201/784; C02F 2101/12; B01D 61/58; B01D 61/025; B01D 61/10; B01D 15/00; B01D 15/02; B01D 2311/04; B01D 2311/06; B01D 2311/12; B01D 2311/36; B01D 2311/2696; B01D 2311/2661; B01D 2311/2634; B01D 2311/2626; B01D 2313/40; B01D 2313/42; B01D 2313/90

See application file for complete search history.

(56) References Cited

U.S. PATENT DOCUMENTS 2,050,771 A * 8/1936 Wait .................... C02F 1/78
                                        210/192
2,218,635 A * 10/1940 Borge ................ B01F 3/04241
                                        261/122.1

(Continued)

FOREIGN PATENT DOCUMENTS

GB            822749 A        10/1959

*Primary Examiner* — Katherine Zalasky McDonald
(74) *Attorney, Agent, or Firm* — Seyfarth Shaw LLP; Brian Michaelis

(57) ABSTRACT

A water purification system that generates ozone and passes the ozone through stored purified water to reduce the growth and/or presence of bacteria, organisms, and/or other undesirable components in purified water.

12 Claims, 3 Drawing Sheets

(51) Int. Cl.
  *B01D 61/02*    (2006.01)
  *C02F 1/28*    (2006.01)
  *B01D 15/02*    (2006.01)

(56) References Cited

U.S. PATENT DOCUMENTS

| | | | | |
|---|---|---|---|---|
| 3,362,697 | A | * | 1/1968 | Silva .................. C02F 1/78 261/114.1 |
| 3,523,891 | A | * | 8/1970 | Mehl .................. C02F 1/46104 210/707 |
| 3,575,350 | A | * | 4/1971 | Willinger ............. A01K 63/042 239/145 |
| 3,683,627 | A | * | 8/1972 | Girden ................ B01F 3/0412 405/52 |
| 3,756,410 | A | * | 9/1973 | Moody ................ B01D 29/01 210/139 |
| 4,007,118 | A | | 2/1977 | Ciambrone |
| 4,029,578 | A | * | 6/1977 | Turk .................. C02F 1/78 210/760 |
| 4,341,641 | A | * | 7/1982 | Novak ................ B01F 3/04539 588/320 |
| 4,639,314 | A | * | 1/1987 | Tyer .................. B01F 3/04262 210/220 |
| 5,045,197 | A | * | 9/1991 | Burrows ................ B01D 61/08 210/321.78 |
| 5,273,664 | A | * | 12/1993 | Schulz ................ B01F 5/045 210/192 |
| 5,399,261 | A | * | 3/1995 | Martin ................ B01D 53/74 210/195.1 |
| 5,910,250 | A | * | 6/1999 | Mahendran ........... B01D 61/18 210/220 |
| 6,077,427 | A | * | 6/2000 | Burrows ................ B01D 61/08 210/198.1 |
| 6,146,524 | A | | 11/2000 | Story |
| 6,251,264 | B1 | | 6/2001 | Tanaka et al. |
| 7,422,684 | B1 | * | 9/2008 | Davis .................. C02F 1/78 210/192 |
| 8,287,743 | B2 | * | 10/2012 | Zha .................. B01D 63/02 210/797 |
| 2001/0042708 | A1 | * | 11/2001 | Barnes ................ C02F 1/006 210/192 |
| 2002/0005385 | A1 | * | 1/2002 | Stevens, Sr. ........... B01D 61/04 210/748.08 |
| 2002/0069664 | A1 | | 6/2002 | Davis |
| 2002/0134740 | A1 | * | 9/2002 | Cote .................. C02F 3/20 210/791 |
| 2002/0153313 | A1 | * | 10/2002 | Cote .................. C02F 3/20 210/636 |
| 2005/0006308 | A1 | * | 1/2005 | Cote .................. B01D 63/023 210/636 |
| 2005/0236432 | A1 | | 10/2005 | Davis |
| 2007/0119779 | A1 | * | 5/2007 | Muramoto ............ B01D 61/02 210/639 |
| 2007/0166171 | A1 | * | 7/2007 | Kondo .................. F04F 1/18 417/118 |
| 2008/0000844 | A1 | * | 1/2008 | Ralph .................. C02F 1/72 210/760 |
| 2009/0178967 | A1 | * | 7/2009 | Kinasewich ........... C02F 1/006 210/205 |
| 2009/0194477 | A1 | * | 8/2009 | Hashimoto ........... B01D 63/02 210/636 |
| 2009/0250407 | A1 | | 10/2009 | Delano |
| 2011/0253604 | A1 | * | 10/2011 | Mercer ................ C01B 13/11 210/85 |
| 2012/0241387 | A1 | * | 9/2012 | Hussain ................ C02F 1/5236 210/721 |
| 2013/0193079 | A1 | | 8/2013 | Booth et al. |
| 2017/0066667 | A1 | * | 3/2017 | Harris ................ E04H 4/1281 |

* cited by examiner

OZONE GENERATOR FOR WATER PURIFICATION SYSTEM

CROSS-REFERENCE TO RELATED APPLICATION

This application claims the benefit of U.S. provisional application Ser. No. 62/412,794 filed on Oct. 25, 2016 and entitled OZONE GENERATOR FOR WATER PURIFICATION SYSTEM, the content of which is herein incorporated by reference in its entirety.

BACKGROUND

Field

Aspects of the present disclosure generally relate to apparatuses and methods for water purification. More specifically, the present disclosure relates to apparatuses configured to generate ozone for water purification systems.

Background

Water is necessary for human existence. In many parts of the world, clean drinking water is difficult to obtain. Many different types of water purification systems and methods have been employed to produce clean drinking water throughout the world.

Although many municipal water systems provide clean and/or purified drinking water, filtration systems have become popular in many offices and homes. These filtration systems often employ a filter of particulates contained within an in-line canister to trap, adsorb, and/or otherwise remove certain chemicals and/or other dissolved solids from the incoming water stream. These filters may employ carbon, activated carbon, or other materials to adsorb, catalyze, and/or otherwise treat the incoming water. Filtration systems may also optionally employ a reverse osmosis filter, either in addition to the particulate filter or instead of the particulate filter, to purify an incoming water supply.

In some filtration systems, a reservoir of purified water may be present to store purified water for on-demand use. Reverse osmosis systems may only generate one gallon of purified water per hour, and as such, a reservoir of purified water may be useful to allow for periods of heavy demand. However, a reservoir of purified water may still be exposed to organisms and/or bacteria that may detrimentally affect the purified water stored in the reservoir.

SUMMARY

The present disclosure describes a water purification system that generates ozone and passes the ozone through stored purified water to reduce the growth and/or presence of bacteria, organisms, and/or other undesirable components (collectively referred to as "biofilm" herein) in purified water.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Figure 1:
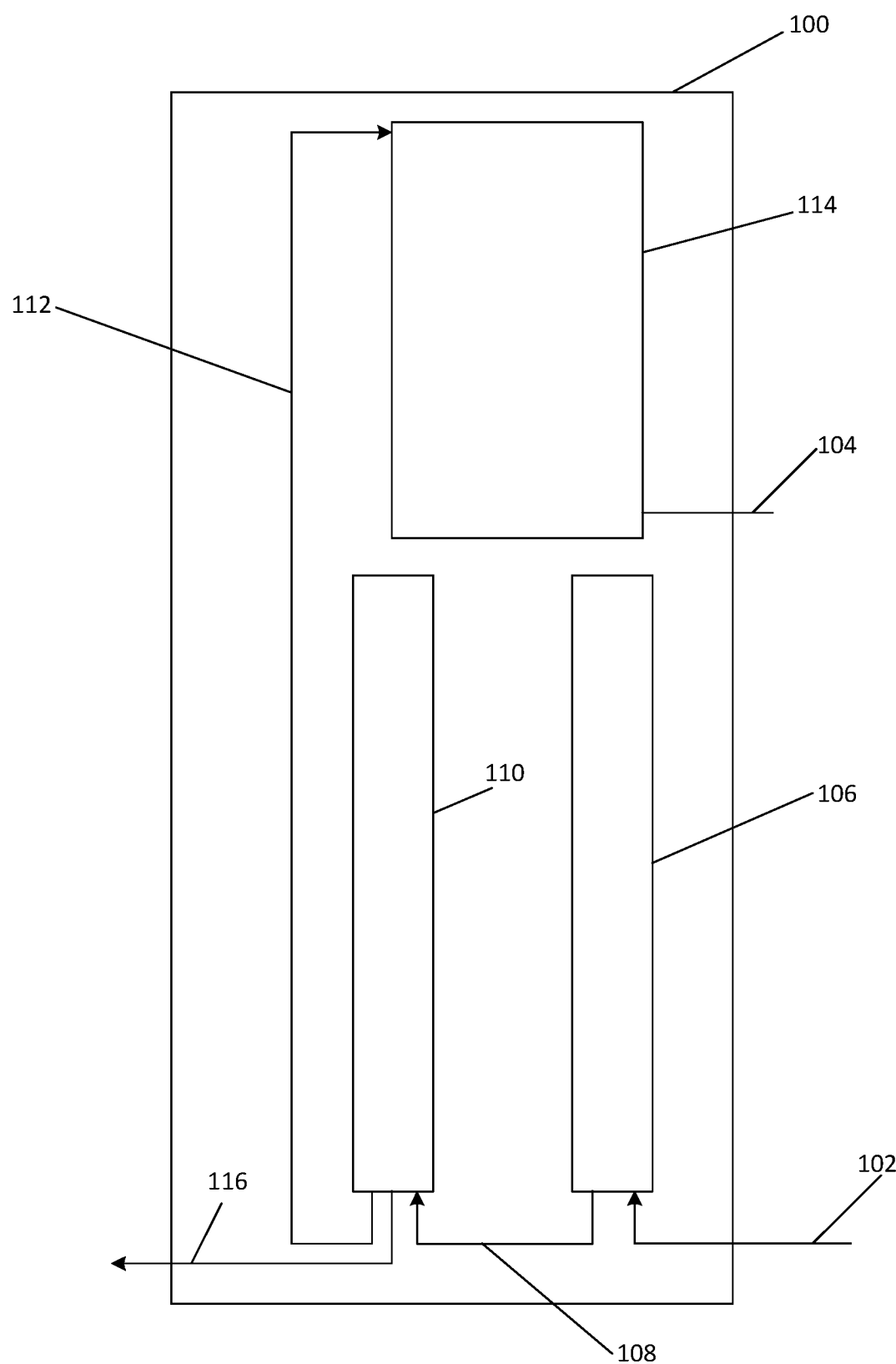
FIG. 1 illustrates a block diagram of a water purification system in accordance with an aspect of the present disclosure.

FIG. 1 illustrates a block diagram of a water purification system in accordance with an aspect of the present disclosure.

System 100 comprises an inlet line 102 and an outlet 104. Inlet line 102 may be coupled to filter 106, which is coupled by line 108 to filter 110. Filter 110 is coupled by line 112 to reservoir 114. Filter 110 also may have a brine (drain) line 116.

Inlet line 102 may be a pipe and/or other connection to a municipal water supply. Outlet 104 may be a faucet, spigot, tap, and/or other selectively controllable valve to permit the flow of fluid from reservoir 114. Inlet line 102, line 108, and line 112 may be conduits, tubes, and/or other piping to connect the various components within system 100. Other components may also be included in system 100 without departing from the scope of the present disclosure. Such optional additional components may include compressors, heating elements, valves, controllers, etc., depending on the complexity and application of system 100 in a particular environment.

Filter 106 may be a particulate filter. For example, and not by way of limitation, filter 106 may remove particulates, e.g., dirt, sand, etc., from the fluid flowing into system 100 from the inlet line 102. Filter 106 may, alternatively and/or in addition, remove dissolved solids from the fluid flowing into system 100 from the inlet line 102. For example, and not by way of limitation, filter 106 may comprise carbon particles that remove chlorine and chloramines from the fluid flowing in inlet line 102 via adsorption. Additives may be placed within filter 106 to catalyze certain dissolved solids from the fluid flowing into system 100. Other chemical, electrical, and/or mechanical methods may be employed within filter 106 to remove solids and/or dissolved solids from the fluid entering system 100 via inlet line 102 without departing from the scope of the present disclosure.

Filter 110 may be a reverse osmosis filter. A reverse osmosis filter removes other dissolved solids from the fluid in the inlet line 102 by passing the fluid through a porous membrane. When the pressure passing the fluid through the membrane (the hydrostatic pressure) is greater than the pressure required for particles to flow through the membrane (the osmotic pressure), the dissolved solids pass through the membrane in a "reverse" direction away from the fluid flow.

Figure 2:
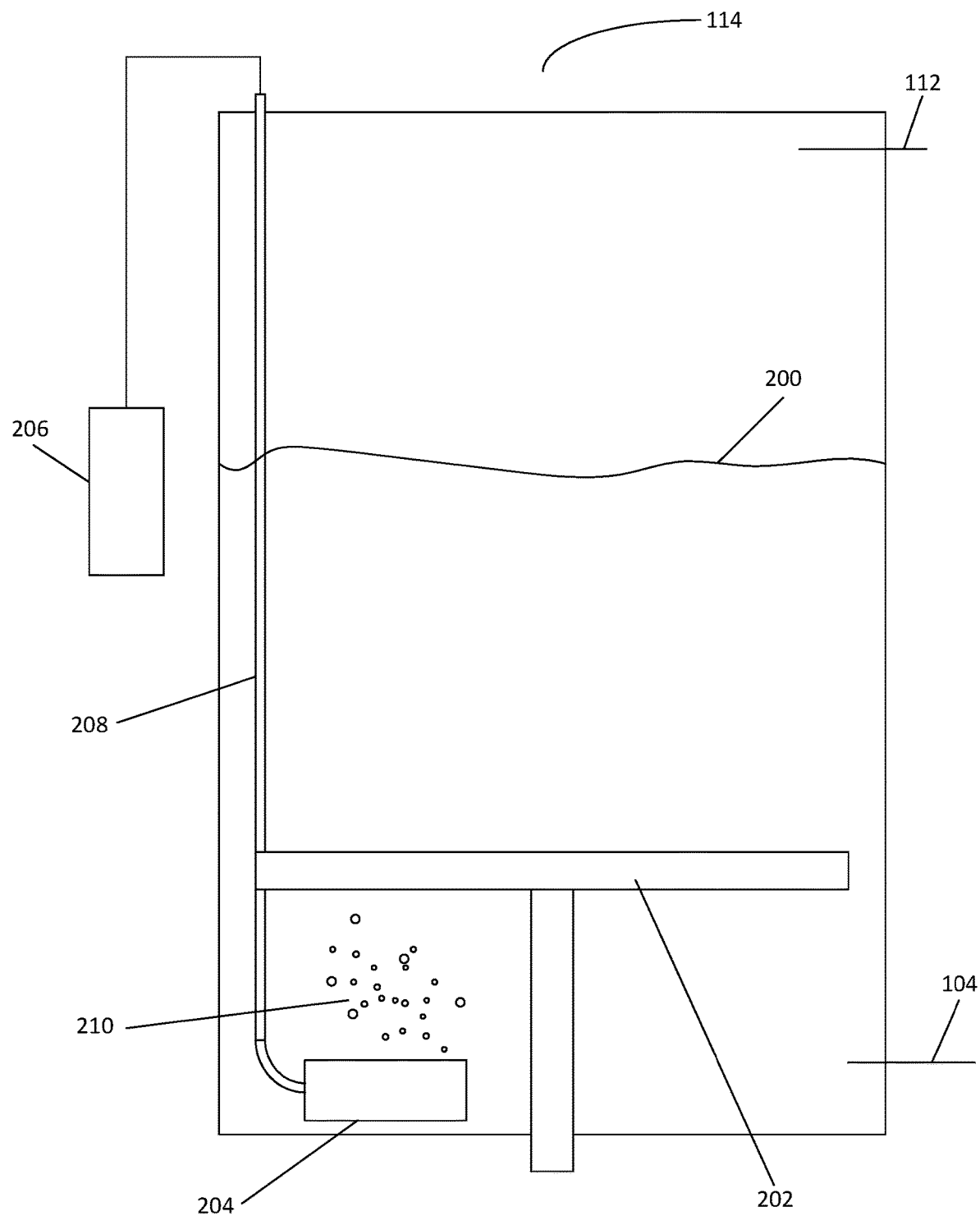
FIG. 2 illustrates a reservoir in accordance with an aspect of the present disclosure.

FIG. 2 illustrates a reservoir in accordance with an aspect of the present disclosure.

Reservoir 114 holds and/or contains fluid 200 after fluid 200 enters reservoir 114. A baffle 202 allows fluid 200 below the baffle 202 to exit reservoir 114 through outlet 104. In some systems 100, an ozone stone 204, which may be coupled to pump 206 by conduit 208, may pump air bubbles 210 through fluid 210 to pass ozone through liquid 200, which may reduce the growth and/or instances of biofilm on an interior surface of reservoir 114. Ozone, also known as trioxygen or $O_3$, acts as an oxidizer for contaminants and/or odors that may be present in reservoir 114.

Figure 3:
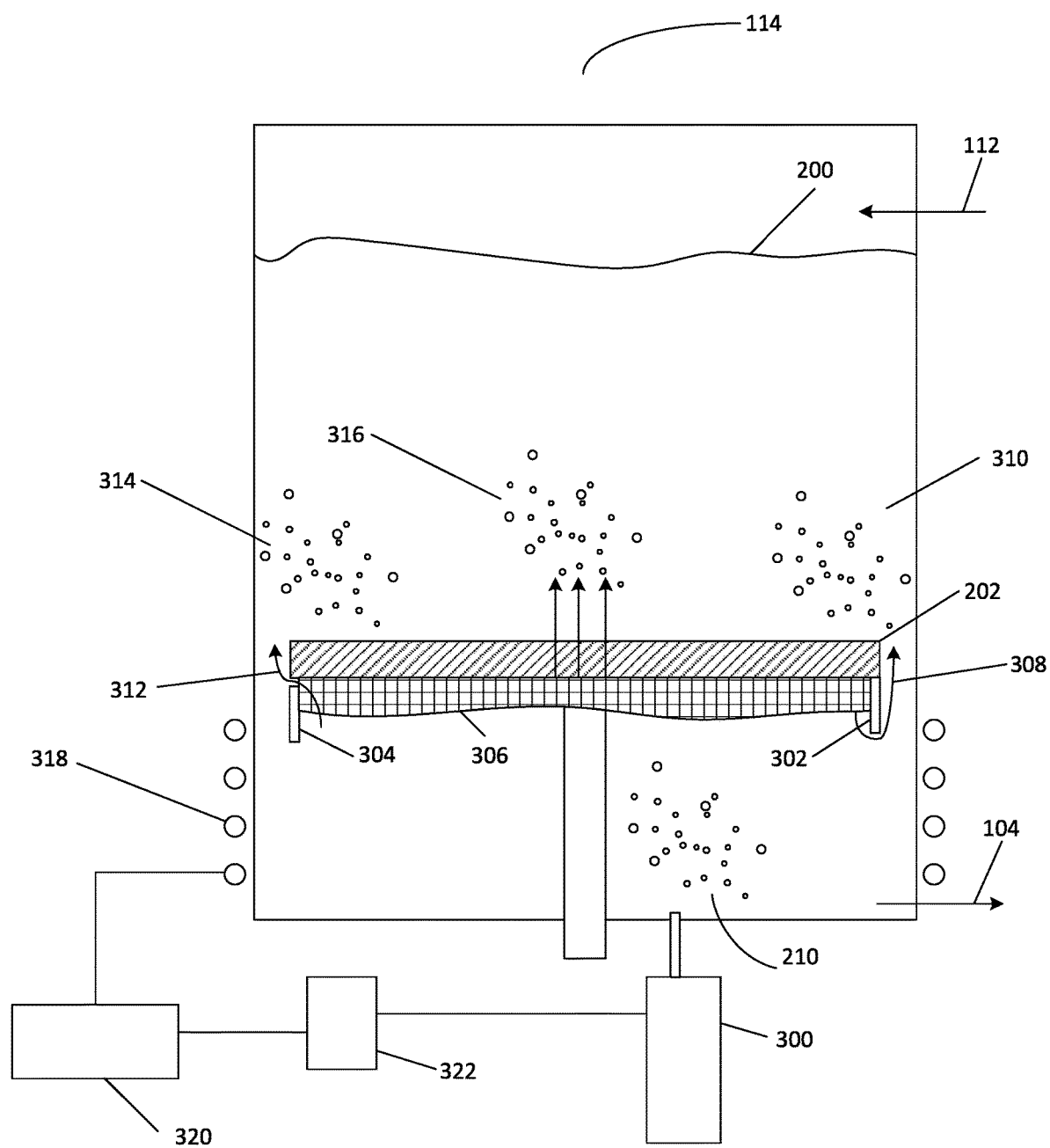
FIG. 3 illustrates a reservoir in accordance with an aspect of the present disclosure.

FIG. 3 illustrates a reservoir in accordance with an aspect of the present disclosure.

Instead of using an ozone stone 204, an aspect of the present disclosure employs an ozone generator 300 coupled to the reservoir 114. Ozone generator 300 outputs ozone bubbles 210, which may be trapped by ridges 302 and/or 304 that are coupled to baffle 202. As such, depending on the configuration of ridges 302 and/or 304, a larger air/ozone bubble 306 (shown as crosshatched in FIG. 3) may be created under baffle 202.

In an aspect of the present disclosure, ridge 302 is coupled to baffle 202 such that no air may escape until a sufficient quantity of air is present in bubble 306. Once enough air is present in bubble 306, the volume of bubble 306 bleeds out around ridge 302 as shown by path 308 and bubbles 310. The increased surface area of ozone bubble 306 may reduce the growth of biofilm within reservoir 114.

In an aspect of the present disclosure, ridge 304 is coupled to baffle 202 such that a small amount of air may escape between ridge 304 and baffle 202. The space between ridge 304 and baffle 202 may be such that a certain amount of fluid pressure from fluid 200 may be required to force bubble 306 to bleed out through path 312 as bubbles 314.

In an aspect of the present disclosure, baffle 202 may be a porous or permeable material, such as a mesh, pumice stone, or other material, such that ozone 210 gas passes through baffle 202 as bubbles 316. In an aspect of the present disclosure, one or more of the bubbles 310, 314, and/or 316 may be employed to reduce the presence of biofilm within reservoir 114.

Refrigeration coils 318 may also be coupled to reservoir 114, and coils 318 may be coupled to a compressor 320 to reduce the temperature of the fluid 200 in reservoir 114. Compressor 320 may be controlled by a controller 322, which may be a timer, thermocouple, and/or other sensor or controller, which operates the compressor 320 based on one or more external parameters. For example, and not by way of limitation, controller 322 may be a processor with a thermocouple input. When the thermocouple reads a threshold temperature of the fluid 200 in the reservoir 114, the controller 322 energizes the compressor 320 to cool the fluid 200. The cooling may take place for a specific time, or until the thermocouple reads another threshold temperature.

Ozone generator 300 may also be controlled by controller 322. Further, the ozone generator 300 may be selectively controlled based on the controller 322 operation of the compressor 320, and/or other controlled portions of system 100. For example, and not by way of limitation, compressor 320 may operate based on the temperature of the fluid 200. If fluid 200 is not replenished very often, e.g., when the system 100 is not used for a period of time, the compressor 320 may not be energized very often. Controller 322 may time how long of a period elapses between compressor 320 energizations, and operate the ozone generator 300 more often during such periods. This control of the ozone generator 300 operation may assist in the reduction of biofilm growth within reservoir 114, as additional ozone generator 300 operation will add additional ozone to fluid 200 that may have less movement during longer periods of compressor 320 inactivity.

The memory of controller 322, which may be internal memory and/or external memory, may be implemented in firmware and/or software implementation. The firmware and/or software implementation methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit (e.g., controller 322). Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" may be used with respect to components. Of course, if the component is inverted, above becomes below, and vice versa. Additionally, if oriented sideways, above and below may refer to sides of a component. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although several embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims.

What is claimed is:

1. A fluid purification method comprising:
    filtering fluid through a particulate filter to remove particulates and first dissolved solids from the fluid;
    filtering the fluid through a reverse osmosis filter to remove second dissolved solids from the fluid;
    flowing the fluid into a reservoir after filtering the fluid through the particulate filter and the reverse osmosis filter, the fluid entering the reservoir above a baffle that transects the reservoir, the baffle including at least one ridge;
    bubbling ozone gas into the fluid in the reservoir below the baffle;
    trapping, below the baffle and within the at least one ridge, a portion of the ozone gas bubbled into the reservoir;
    forming a bubble of ozone gas below the baffle;
    increasing the volume of the bubble of ozone gas;

bleeding the bubble from below the baffle by allowing the bubble of ozone gas to bleed out between the at least one ridge and the baffle; and flowing the fluid out of the reservoir below the baffle.

2. The fluid purification method of claim 1, wherein bubbling ozone gas into the fluid comprises pumping the ozone gas through a conduit into a stone located in the reservoir below the baffle, the ozone gas being released into the liquid through the stone.

3. The fluid purification method of claim 1, wherein bubbling ozone gas into the fluid comprises generating ozone gas which is released into the reservoir.

4. The fluid purification method of claim 3, further comprising:

activating and deactivating a compressor coupled to refrigeration coils around a periphery of the reservoir based on a temperature of the fluid in the reservoir; and activating the ozone generator based at least in part on how long a period of time elapses between compressor energizations, increasing how often the ozone generator is active during periods in which the compressor is inactive.

5. The fluid purification method of claim 1, further comprising:

controlling a flow of the fluid out of the reservoir.

6. The fluid purification method of claim 1, further comprising:

removing a brine comprising the second dissolved solids removed from the fluid by the reverse osmosis filter via a drain line.

7. The fluid purification method of claim 1, wherein the fluid is water, the method further comprising connecting the particulate filter to a water supply.

8. The fluid purification method of claim 1, further comprising a first ridge and a second ridge disposed on a respective first side and a respective second side of the baffle, wherein the ridges are configured to trap a bubble of a desired size below the baffle.

9. A fluid purification method comprising:

flowing a fluid into a reservoir, the fluid entering above a baffle that transects the reservoir, the baffle including at least one ridge;

bubbling ozone gas into the fluid in the reservoir below the baffle;

trapping the ozone gas below the baffle using the at least one ridge;

forming a bubble of ozone gas below the baffle;

increasing the volume of the bubble of ozone gas;

retaining the bubble of ozone gas below the baffle until the bubble reaches a predetermined size; allowing the bubble of ozone gas to bleed out around the at least one ridge; and flowing the fluid out of the reservoir below the baffle.

10. The fluid purification method of claim 9, further comprising allowing the bubble of ozone gas to bleed out between the at least one ridge and the baffle.

11. The fluid purification method of claim 10, further comprising applying fluid pressure to force the bubble of zone gas to bleed out between the at least one ridge and the baffle.

12. The fluid purification method of claim 9, further comprising passing the ozone gas through the baffle as bubbles.

* * * * *